United States Patent Office 3,054,774
Patented Sept. 18, 1962

3,054,774
PROCESS FOR POLYMERIZING ACROLEIN AND
α-SUBSTITUTED ACROLEIN
Robert Lee Eifert and Barnard Mitchel Marks, Wilmington, Del., assignors to E. I. du Pont de Nemours and Company, Wilmington, Del., a corporation of Delaware
No Drawing. Filed Feb. 6, 1957, Ser. No. 638,445
6 Claims. (Cl. 260—67)

The present invention relates to the polymerization of α,β-unsaturated aldehydes excluding those substituted in the β-position and more particularly to acrolein and α-substituted acroleins such as methacrolein to form novel, soluble high molecular weight polymers.

Acrolein and methacrolein, as well as other 2-substituted acroleins possess an inherent tendency to undergo autopolymerization with themselves and give infusible, insoluble cross-linked resins which are of little or no value as plastic materials. The spontaneous polymerization of acrolein and methacrolein occurs on slight heating, contact with oxygen, or even contact with light and is greatly accelerated by acidic, basic or free radical catalysts. These insoluble products are probably composed of low molecular weight, vinyl polymer units whose aldehyde groups have undergone further reaction, common to aldehydes to give a three dimensional, cross-linked, insoluble polymer. There is also the possibility that other types of cross-linking reactions participate in the formation of the polymer structure. Soluble copolymers containing minor amounts of methacrolein and especially acrolein, have been prepared previously but high molecular weight polymers containing more than 5 or 10% of such aldehydes have generally been found to be insoluble. In addition, acrolein, methacrolein, and other α,β-unsaturated aldehydes have been converted to very low molecular weight soluble homopolymers containing up to 20 or 25 monomer units per polymer molecule by polymerization in methanolic solution with free radical catalysts at elevated temperatures. Thus the polymerization of methacrolein and acrolein to form high molecular weight soluble viscosity stable polymers has heretofore not been achieved.

It is, therefore, one of the objects of the present invention to prepare solid high molecular weight polymers of acrolein and methacrolein which are completely soluble in one or more organic solvents. It is another object of this invention to provide a novel process for the polymerization of such α,β-unsaturated aldehydes. Further objects will become apparent hereinafter.

The objects of the present invention are accomplished by polymerizing α,β-unsaturated aldehydes such as acrolein and methacrolein with a tertiary phosphine catalyst, the quantity of said catalyst being less than 0.15 mol percent of the monomer, in the presence of a secondary alcohol, and at a temperature of —80 to +30° C. and recovering a polyaldehyde having an inherent viscosity of 0.15 to 0.60 in pyridine or dimethylformamide. It was discovered in contrast to the teachings of the prior art that the polymerization of acrolein and methacrolein in concentrated solution containing minor amounts of a secondary alcohol, under certain conditions, led to the formation of high molecular weight soluble polymers. Thus, non-cross-linked polymers of acrolein and methacrolein are obtained when a tertiary phosphine catalyst is employed if and when a quantity of a secondary alcohol is present during the polymerization.

The process of the present invention is generally carried out in concentrated solutions of the monomer containing limited amounts of a secondary alcohol as the polymerization medium. It is, however, possible to add a diluent to the reaction medium to decrease the viscosity of the resulting polymer solution. Such diluents should be inert toward the monomer as well as toward the catalyst. Preferred diluents are therefore, ketones, esters, amides, and other non-polar compounds such as aromatic and aliphatic hydrocarbons. Since the molecular weight of the polymer formed is highly concentration dependent it is necessary in order to avoid low molecular weight polymer formation to limit the dilution even with such inert solvents. In order to prepare high molecular weight polymers, it was found that the quantity of diluents added including the secondary alcohol should not greatly exceed the quantity of monomer. At concentrations lower than 50% the polymerization of methacrolein employing a tertiary phosphine catalyst is exceedingly slow and leads only to low molecular weight polymers. While in the case of acrolein the concentration of the diluent can be as high as 75% of the total reaction medium.

The catalysts used for the polymerization of acrolein and methacrolein according to the present invention are anionic catalysts and in particular trivalent phosphines. Tertiary phosphines ($R_3P$) where R is an aryl, alkyl, alkoxy or dialkyl amino radical readily polymerize acrolein but only the trialkyl and tri(dialkylamino) phosphines are effective under the same conditions for methacrolein. In addition to the tertiary phosphines it is possible to employ trialkyl phosphites as catalysts in the polymerization of acrolein. Although the hydrocarbon radical on the phosphorus atom may be varied greatly in structure, it is preferred to employ simple phosphines such as triethyl phosphine or triphenyl phosphine, since these phosphines are more readily available and furthermore show high catalytic activity. The quantity of catalyst employed varies in general from 0.001 to 0.15 mol percent of the monomer. The upper concentration limit stated is critical in that at higher concentration the polymerization of acrolein and methacrolein leads to the formation of low molecular weight polymers only. Concentrations of catalyst lower than 0.001 mol percent result in uneconomic, slow polymerization rates. The catalyst may be added as such or may be added to the monomer in the form of a solution. Similar to the diluent employed for the monomer, the diluent for the catalyst should be inert to the monomer and catalyst, i.e., the diluent should neither react, catalyze, complex nor coordinate with the monomer or the polymerization catalyst.

The process of polymerizing methacrolein according to the process of the present invention is carried out in the presence of a small quantity of a secondary alcohol. The addition of the secondary alcohol is necessary to inhibit reaction of the carbonyl group to form cross-linked polymers. It was found that secondary alcohols are particularly suitable for this purpose. The secondary alcohols can be aliphatic or aromatic in nature. Secondary alcohols having a bulky hydrocarbon substituent are not preferred since the latter limits the inhibiting action of the alcohol. Thus secondary alcohols having less than 10 carbon atoms are most useful. Primary alcohols employed heretofore are not suitable for the purpose of inhibiting the formation of cross-linked polymers because of their polar structure which in the ionic polymerization employed in the present invention makes them strong transfer agents and thus prevents the formation of high molecular weight polymers. Although it is possible to employ tertiary alcohols, their use is not preferred since the inhibiting action is greatly decreased. The quantity of the secondary aliphatic alcohol necessary to inhibit the cross-linking reaction of the carbonyl groups in the polymer is exceedingly small. The minimum quantity will depend in part on the polymerization conditions employed. Thus the lower the polymerization temperature, the smaller the quantity of the secondary alcohol necessary to prevent cross-linking. Although there is no critical upper limit to the quantity of the secondary alcohol employed, the quantity of the secondary alcohol should not exceed the dilution of the monomer to a concentration below 50% of the total reaction mixture for reasons disclosed hereinabove. In general, the quantity of the secondary alcohol will vary from 0.01 to 40 mol percent of the monomer in the case of methacrolein, and 25 to 80 mol percent in the case of acrolein.

The monomer employed in the polymerization of acrolein and methacrolein according to the present invention should be highly purified before it is used in the polymerization. In particular, the monomer should be freed of polymerization inhibitors and such polar compounds as water which act as strong chain transfer agents in the ionic polymerization of the present invention. Commercially available acrolein and methacrolein may be purified by various means such as by precipitation of the impurities and inhibitors, by adsorption or by distillation. A preferred method of purifying methacrolein and one which will result in essentially water-free methacrolein is the distillation of methacrolein in the presence of high boiling primary or secondary alcohols, such as n-amyl alcohol. Acrolein can likewise be prepared by the same or other procedures.

The polymerization of acrolein and methacrolein employing an anionic catalyst is carried out in a dry oxygen-free atmosphere. Oxygen was found to cause the formation of low molecular weight polymers, probably due to the oxidation of the acrolein and methacrolein to acidic compounds which act as strong chain transfer agents. The presence of water in the polymerization system should be avoided for its activity as a chain transfer agent. Since the catalysts employed in the present invention are active at very low temperatures, e.g., as low as −80° C., temperatures below room temperature are preferably employed. Such low temperatures, furthermore, decrease the activity of the carbonyl group in the polymer towards cross-linking reactions. A highly suitable temperature range is from − 50° to 0° C. Since the monomer is liquid under polymerization conditions, the polymerization is generally carried out at atmospheric pressures. Although it is possible to employ either higher or lower pressures, no advantage is derived thereby.

The process is further illustrated by the following examples.

*Example I*

A 1 l. three necked flask equipped with thermometer, stirrer, gas inlet and outlet, and condenser was heated to remove any moisture present and then cooled in a stream of pure dry nitrogen. Into the flask was then charged under nitrogen 50 ml. of purified methacrolein, 25 ml. of dimethylacetamide and 0.10 ml. of secondary butyl alcohol. The reaction mixture was then cooled to −20° C. and 0.07 ml. of triethyl phosphine was added to the reaction mixture. The temperature was maintained at −20 to −15° C. The polymerization was continued for 90 minutes under slight agitation. The reaction mixture was warmed to room temperature and the polymer was precipitated by adding an excess of methanol. After washing and drying, there was obtained 8 g. of polymethacrolein having an inherent viscosity of 0.36.

*Example II*

Employing the procedure described in Example I, 50 ml. of purified methacrolein was polymerized in 25 ml. of n-heptane containing 0.125 ml. of triethyl phosphine in the presence of 0.05 ml. of secondary butanol. The polymerization was carried out at −30° C. for a period of 120 minutes under slight agitation. There was obtained 6 g. of polymer having an inherent viscosity of 0.19. Infrared analysis of the polymethacrolein indicated a polymer having pendant carbonyl groups.

*Example III*

A 500 ml. three-necked flask equipped with thermometer, stirrer, gas inlet and outlet, and condenser was heated to remove any moisture present and then cooled in a stream of pure, dry nitrogen. Into the flask was then charged under nitrogen 50 ml. of purified acrolein in 72 cc. of freshly distilled air free sec. butanol. The reaction mixture was then cooled to 2° C. and 2 cc. of a saturated solution of $K_2CO_3$ in sec. butanol added followed by 0.0015 g. of triphenyl phosphine dissolved in the same solvent. The heat of the reaction brought the temperature to 7° C. in spite of the cooling bath. The reaction mixture was cooled to 4° C. and allowed to stir at this temperature for an additional 60 minutes during which time the solution gelled. The polymer was precipitated and washed with cyclohexane and dried. There was obtained 20.6 g. (49%) of polyacrolein having an inherent viscosity of 0.49.

*Example IV*

Employing the procedure described in Example III, 50 ml. of purified acrolein was polymerized in 40 ml. of purified isopropanol using 0.003 g. of triphenyl phosphine. The temperature was maintained at 4° C. except during the initial exothermic reaction when a temperature of 9° C. was reached. The polymerization was allowed to proceed for 30 minutes at which time the polymer was precipitated with cyclohexane, washed and dried. There was obtained 30 g. of polyacrolein having an inherent viscosity of 0.27.

*Example V*

A 1 l. three-necked flask equipped with thermometer, stirrer, gas inlet and outlet, and condenser was heated to remove any moisture present and then cooled in a stream of pure dry nitrogen. Into the flask was then charged under nitrogen 50 ml. of purified methacrolein and 5 ml. of purified isopropyl alcohol. The reaction mixture was cooled to 0° C. and 0.08 ml. of tri(diethylamino) phosphine was added. The temperature was maintained at 0 to 15° C. The polymerization was continued for 90 minutes under slight agitation. The reaction mixture was then warmed to room temperature and the polymer was precipitated by adding an excess of methanol. After washing and drying there was obtained 8 g. of a soluble polymethacrolein.

*Example VI*

A 500 ml. three-necked flask equipped with thermometer, stirrer, gas inlet and outlet, and condenser was heated to remove any moisture present and then cooled in a stream of pure, dry nitrogen. Into the flask was then charged under nitrogen 25 ml. of purified acrolein, 25 ml. is isopropanol, and 25 ml. of trichloromethane. The reaction mixture was then cooled to 30° C. and 0.025 g. of tridiethyl amino phosphine was added. The polymerization was continued for 15 hours at that temperature. The polymer obtained was precipitated out of the reaction mixture, washed with cyclohexane and dried. There was obtained 13.8 g. of a solid soluble polyacrolein.

Although the examples illustrated hereinabove have shown the polymerization of acrolein and methacrolein primarily, the process of the present invention is also applicable to other α-substituted acroleins. The process of the present invention may also be adapted to the copolymerization of acrolein and methacrolein with suitable comonomers such as acrylonitrile, methacrylates, vinyl acetates, etc.

The acrolein and methacrolein polymers prepared by the process of the present invention are high molecular weight, soluble, stable polymers which possess sufficient melt flow at elevated temperatures to be fabricated into useful articles. The polymers of the present invention differ from the prior art polymers of α,β-unsaturated aldehydes in their solubility, molecular weight and stability.

The molecular weight of aldehyde polymers is best determined by employing a relative measure such as inherent viscosity. The inherent viscosity measurements listed in the above examples were obtained by employing an 0.5% solution of the polymer in dimethylformamide and measuring the inherent viscosity at 35° C. Inherent viscosity is calculated by the following formula:

$$\text{inh} = \ln\left(\frac{t}{t_o}\right) \times \frac{1}{C}$$

wherein $t_o$ is the efflux time of the solvent, and $t$ the efflux time of the solution and "$C$" the concentration of the polymer in grams per 100 g. of solvent.

Polyaldehydes prepared by the process of the present invention are colorless transparent plastics that can be cast from solution into stiff films and sheets. The stability of the polymer is such that it can be compression molded at 250 to 275° C. into clear films without noticeable degradation. The ability to mold polymethacrolein clearly indicates the superior stability of the polymethacroleins of the present invention as compared to prior art polymers. The polymer reacts with the usual aldehyde reactants to form diacylates, oximes, acetals, thioacetals, Shiff bases and can also be reduced to the corresponding methallyl alcohol polymer. The reactions with the typical aldehyde reagents and infra-red spectra of polymer samples indicate the presence of aldehyde groups.

Polyaldehydes prepared by the process of the present invention may be employed for a large number of applications and casting of films, sheets, and other articles. The stability of polyaldehydes of the present invention may be improved by the addition of stabilizers; pigments or other additives are readily included. The polymer may be blended with other polymeric materials. The polymers are particularly valuable as chemical intermediates and a wide variety of polymers can be prepared through reaction of the aldehyde group. The polymers can, of course, be cross-linked and are readily combined with fibrous structures to form reinforced plastics with outstanding physical properties.

We claim:

1. A process for polymerizing α,β-unsaturated, aldehydes of the class consisting of acrolein and α-substituted acroleins, which comprises contacting, under dry, oxygen free conditions the α,β-unsaturated aldehyde with a tertiary phosphine catalyst of the class consisting of trialkyl phosphines and tri(dialkylamino)phosphines, the quantity of said catalyst being less than 0.15 mol percent of the monomer, in the presence of from 0.1 mol percent to 50% of the total reaction medium of a secondary alcohol and a non-polar diluent present in an amount such that the total amount of said non-polar diluent and said secondary alcohol does not exceed 50% of the total reaction medium, and at a temperature of −80 to +35° C. and recovering a high molecular weight soluble polymer of the α,β-unsaturated aldehyde having an inherent viscosity above 0.15 as determined by a 0.5% solution in dimethylformamide at 35° C.

2. A process for polymerizing acrolein which comprises contacting, under dry, oxygen free conditions acrolein with a tertiary phosphine catalyst of the class consisting of trialkyl phosphines and tri(dialkylamino) phosphines, the quantity of said catalyst being less than 0.15 mol percent of the monomer in the presence of from 0.1 mol percent to 75% of the total reaction medium of a secondary alcohol and a non-polar diluent present in an amount such that the total amount of said non-polar diluent and said secondary alcohol does not exceed 75% of the total reaction medium, at a temperature of −80 to +35° C. and recovering a soluble acrolein polymer having an inherent viscosity above 0.15 as determined by a 0.5% solution in dimethyl formamide at 35° C.

3. A process for polymerizing methacrolein which comprises contacting, under dry, oxygen free conditions methacrolein with a trialkyl phosphine catalyst, the quantity of said catalyst being less than 0.15 mol per cent of the monomer, in the presence of a secondary alcohol and a non-polar diluent present in an amount such that the total amount of said non-polar diluent and said secondary alcohol does not exceed 50% of the total reaction medium, at a temperature of −80 to +35° C. and recovering a soluble methacrolein polymer having an inherent viscosity of 0.15 to 0.60 as determined by a 0.5% solution in dimethyl formamide at 35° C.

4. The process as set forth in claim 1 wherein the monomer is admixed with less than 50% of the total reaction mixture of an inert diluent.

5. The process as set forth in claim 1 wherein the catalyst is triethyl phosphine.

6. The process as set forth in claim 1 wherein the secondary alcohol is secondary butanol.

References Cited in the file of this patent

UNITED STATES PATENTS

| | | |
|---|---|---|
| 2,657,192 | Miller et al. | Oct. 27, 1953 |
| 2,675,372 | Coover et al. | Apr. 13, 1954 |
| 2,840,617 | Shokal | June 24, 1958 |
| 2,924,589 | Jurgeleit | Feb. 9, 1960 |

OTHER REFERENCES

Jurgeleit, German application V6712 IVb, Oct. 11, 1956.

UNITED STATES PATENT OFFICE
CERTIFICATE OF CORRECTION

Patent No. 3,054,774                 September 18, 1962

Robert Lee Eifert et al.

It is hereby certified that error appears in the above numbered patent requiring correction and that the said Letters Patent should read as corrected below.

Column 4, line 54, for "is" read -- of --; column 5, line 45, column 6, lines 9 and 23, after "conditions", each occurrence, insert a comma; same column 6, line 26, after "of" insert -- from 0.1 mol percent to 50% of the total reaction medium of --.

Signed and sealed this 19th day of February 1963.

(SEAL)
Attest:

ESTON G. JOHNSON
Attesting Officer

DAVID L. LADD
Commissioner of Patents